FIG. 1.

Nov. 8, 1966    D. R. SMITH    3,283,625
MULTI-SPINDLE AUTOMATIC LATHES
Filed Jan. 25, 1965    8 Sheets-Sheet 2

United States Patent Office 3,283,625
Patented Nov. 8, 1966

3,283,625
MULTI-SPINDLE AUTOMATIC LATHES
Donald Raymond Smith, Coventry, England, assignor to Alfred Herbert Limited, Coventry, England
Filed Jan. 25, 1965, Ser. No. 427,652
Claims priority, application Great Britain, Jan. 23, 1964, 2,915/64
10 Claims. (Cl. 82—3)

The invention relates to multi-spindle automatic lathes.

Hitherto in such lathes, the work-carrying spindles have been mounted for indexing relatively to stationary tool-carrying slides. The mounting of the spindles in such a way as to enable them to be indexed involves a reduction in their rigidity compared with a normal lathe spindle, which is carried in a mounting rigidly fixed to the body of the lathe. The rotary indexing of the spindles also involves the provision of means for so locating and aligning the spindles in each of their indexed positions that each spindle will be accurately aligned with the corresponding tool slide. Another disadvantage of indexing the spindles is that, as each spindle mounting has considerable mass, a very powerful indexing drive is required. Furthermore, the driving mechanism of each spindle must be released and re-engaged before and after each indexing movement.

An object of the invention is to provide a multi-spindle automatic lathe in which the above disadvantages are avoided.

According to the invention, a multi-spindle automatic lathe includes a plurality of rotatable spindles, each mounted in fixed bearings and having their axes of rotation arranged parallel with each other and spaced apart circumferentially about a common axis parallel with the axes of the spindles; the same number of chucks as there are spindles, the chucks being arranged with their axes parallel with the said common axis and spaced apart circumferentially therearound at the same radial distances therefrom and at the same circumferential spacing as the spindles; means for engaging each chuck with a corresponding spindle for driving rotation thereby, the said means being disengageable when the chucks are to be separated from the respective spindles; an annular chuck carrier coaxial with the said common axis and engageable with the chucks; means for moving the chuck carrier axially into and out of a position in which each chuck is so engaged with a corresponding spindle as to be rotated thereby, and means for moving the chuck carrier circumferentially, when the chucks have been separated from the respective spindles by the chuck carrier, thereby to effect a rotary indexing of the chuck carrier and the chucks with respect to the spindles.

Although the invention is not restricted to a lathe in which the spindles are vertical, that is a convenient arrangement as it enables the chucks to rest on the upper ends of the respective spindles to effect driving engagement therewith, the chuck carrier being movable axially between a lower position in which the carrier is clear of the chucks and a higher position to which it has lifted the chucks and in which it supports them clear of the respective spindles.

In the latter arrangement, the means for moving the chuck carrier axially may be operated by the application thereto of a pressurised fluid, the chuck carrier, when in its raised position, in which it has lifted the chucks out of engagement with the respective spindles, resting on a cushion of the fluid, thereby to facilitate the rotary indexing of the chuck carrier together with the chucks.

The chuck carrier may have cylindrical flanges at its inner and outer peripheries, the said flanges being slidable with respect to corresponding cylindrical surfaces of a housing enclosing the spindles and the indexing means, thereby to separate the machining region from the interior of the housing. Means may also be provided to introduce compressed air into the interior of the housing, the compressed air being allowed to escape to atmosphere between the radially outer flange of the chuck carrier and the adjacent cylindrical surface of the housing, the latter also forming a wall of a trough in which swarf and coolant is collected and from which it is removed, the leakage of compressed air outwardly through the said clearance thereby preventing swarf and coolant from entering the interior of the housing.

A multi-spindle lathe in accordance with the invention will now be described with reference to the accompanying drawings, in which.

Figure 1:
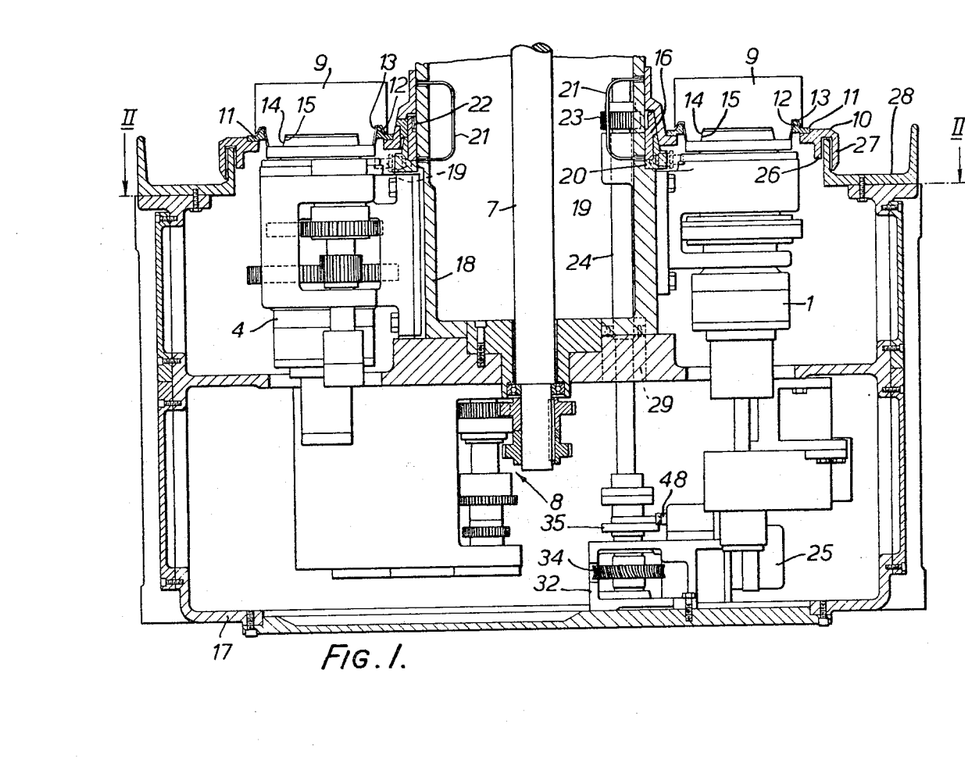
FIGURE 1 is a vertical transverse section through a lower part of the lathe, this section being taken on the line I—I in FIGURE 2.
Figure 2:
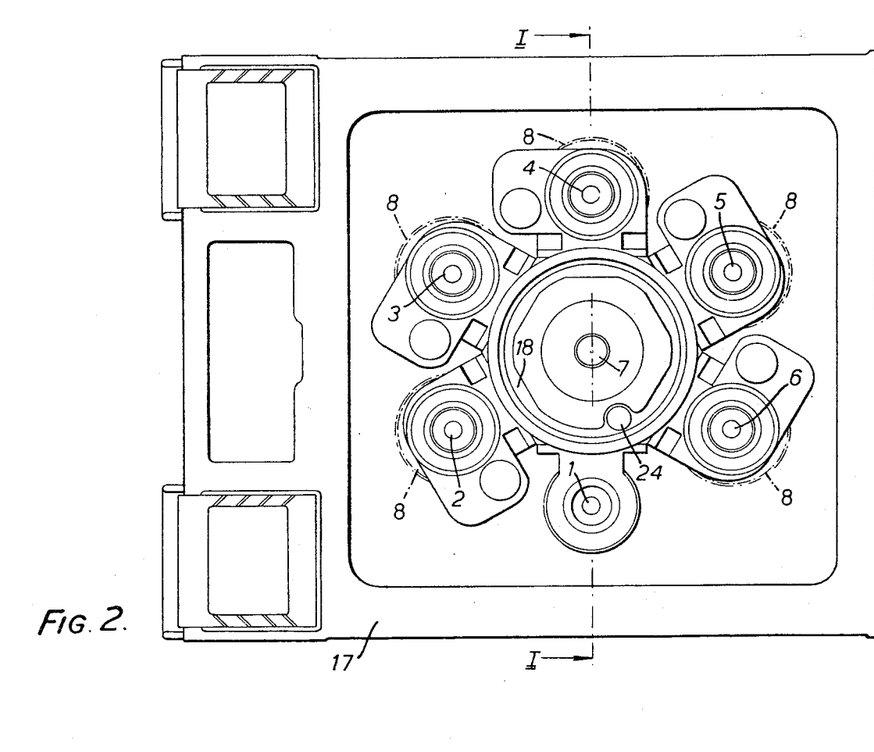
FIGURE 2 is a plan on the line II—II in FIGURE 1 of the said lower part of the lathe shown in FIGURE 1.

Referring to FIGURES 1 and 2, the lathe comprises a plurality of upright rotatable spindles 1–6 mounted in fixed bearings in a housing 17 and positioned in a circular arrangement around a central driving shaft 7, from which a gear drive of which part is shown at 8 to each of the spindles is provided, except to one of the spindles 1, which is not power-driven and is used for loading and unloading a chuck in axial registration therewith. Referring now to FIGURE 1 only, a chuck 9 is positioned at the upper end of each spindle 1–6 and interposed between each chuck and the respective spindle there is a common annular rotatable chuck carrier 10, which is movable vertically, on a central stationary tubular column 18 mounted in the housing 17, between an upper position in which the carrier disengages the chucks from the spindles and drivingly engages the chucks for effecting rotary indexing of the chucks with respect to the spindles and a lower position (as illustrated in FIGURE 1) in which the chucks are drivingly engaged with the respective spindles and are disengaged from the chuck carrier. The chuck carrier 10 has six holes equally-spaced apart in the circumferential direction and each containing a chuck-bearing ring 11 having a frusto-conical outer peripheral surface 12 engageable with a similar surface 13 on a respective chuck 9. The frusto-conical surfaces of the rings 11 and the chuck 9 are engaged together when the chuck carrier 10 is raised, whereby on rotational movement of the chuck carrier, the chucks will be indexed with respect to the spindles. The chucks and the spindles also have frusto-conical surfaces 14, 15 which are held in engagement with one another by releasable locking means (not shown) after the chuck carrier 10 has been lowered, whereby the rotational drive from each of the spindles 2–6 is transmitted to the respective chuck 9. The chuck carrier 10 is raised, after the locking means associated with each spindle has been released, by applying oil under pressure underneath a lifting ring 16, engaging a frusto-conical surface at the inner periphery of the chuck carrier 10 and guided for vertical movement by the outer cylindrical surface of the column 18. Oil is applied to the lower surface of the lifting ring 16 through pipe unions 19 connected in a control circuit described hereinafter and shown in FIGURE 5, the pipe unions being mounted in an annular block 20 mounted on the column 18 and defining therewith an annular chamber containing the lifting ring 16. Oil is also conveyed from the said chamber through pipes 21 to the co-operating cylindrical surfaces of the column 18 and the chuck carrier 10 for lubrication purposes. When oil is admitted under pressure to the chamber containing the lifting ring 16, the latter and the chuck carrier 10 will be raised as aforesaid and the lifting ring will float on a cushion of oil, thereby permitting the lifting ring 16 together with the chuck carrier 10 and the chucks to be rotatively indexed. The chuck carrier 10 is lowered by permitting the oil to flow from beneath the lifting ring 16 through the pipe unions 19. The inner surface of the lifting ring 16 has an annulus of gear teeth 22 formed thereon, the teeth being engaged by a pinion 23 mounted on an upright driven indexing shaft 24 (see also FIGURES 1, 2, 3 and 4). The shaft 24 is rotated in a bearing 29, supported in the housing 17, by a fluid system including a fluid-operable motor 25 (see also FIGURES 3 and 4), and thus, when the chuck carrier 10 has been raised, the latter can be moved in a circumferential direction, thereby indexing the chucks from positions in which each chuck is axially aligned with one spindle to positions in which each chuck is axially aligned with another spindle. The indexing motor is controlled by appropriate selector or trip switches and the chucks may be indexed between adjacent indexing positions or through several indexing positions as will hereinafter be described with reference to FIGURE 5. At the end of each indexing movement, the chuck carrier is lowered and disengaged from the chucks, which are engaged by the respective spindles, thereby permitting the appropriate machining operations to take place. When these have been completed, the spindles are stopped, the chucks are released from the spindles and the chuck carrier is raised, enabling the chucks to be indexed to new positions.

Referring again to FIGURE 1, it will be seen that the outer periphery of the chuck carrier 10 has a pair of integral, radially-spaced, axial flanges 26, 27 which embrace with radial clearance a side wall of an annular channel 28 mounted on the housing 17 and arranged to collect swarf and coolant from the vicinity of the chucks, the swarf and coolant being removed from the channel during operation of the lathe. The space within the housing 17 and beneath the chuck carrier 10 is pressurised by a supply of compressed air which is prevented from flowing between the inner peripheral wall of the chuck carrier and the column 18; but is allowed to escape to the ambient air by flowing between the flanges 26, 27 and the side wall of the channel 28 embraced by them. This intentional leakage of compressed air prevents swarf and coolant from entering the interior of the housing and causing damage to the spindles and their driving mechanism or to the indexing mechanism.

Figure 3:
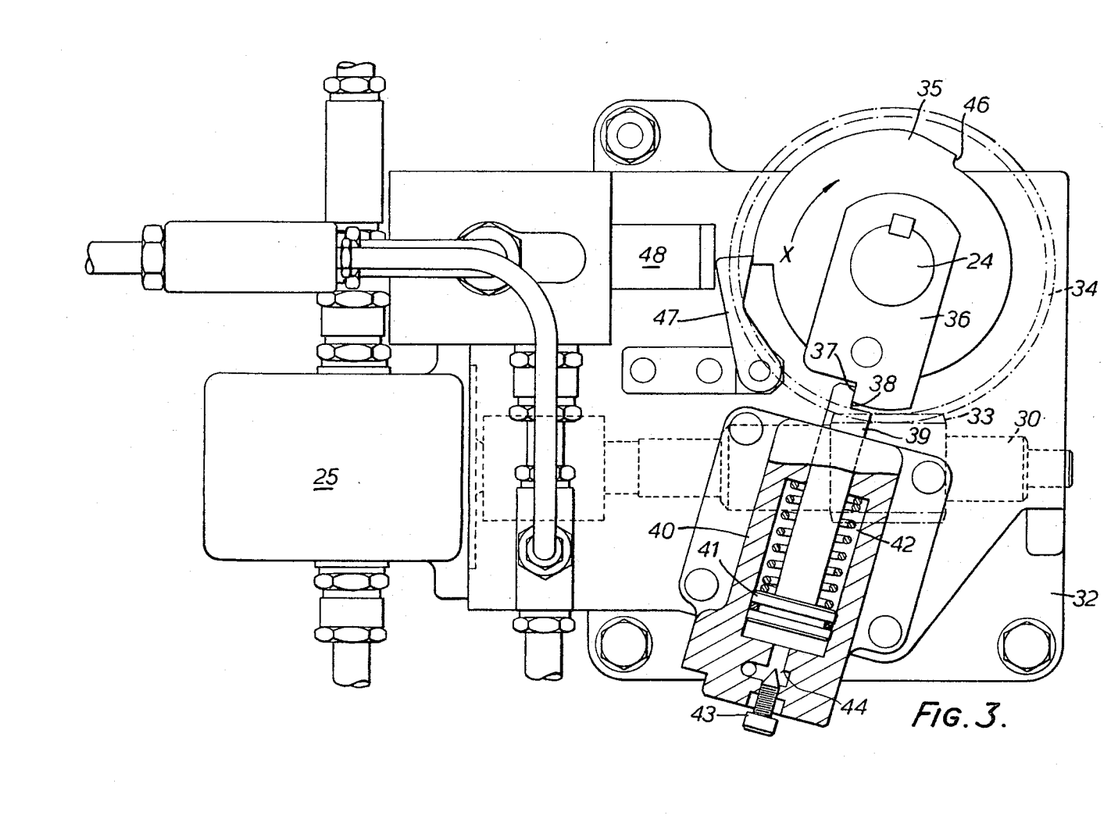
FIGURE 3 is a plan of the indexing mechanism for the aforesaid chuck carrier, which is shown in FIGURE 1, this figure being to a considerably larger scale.
Figure 4:
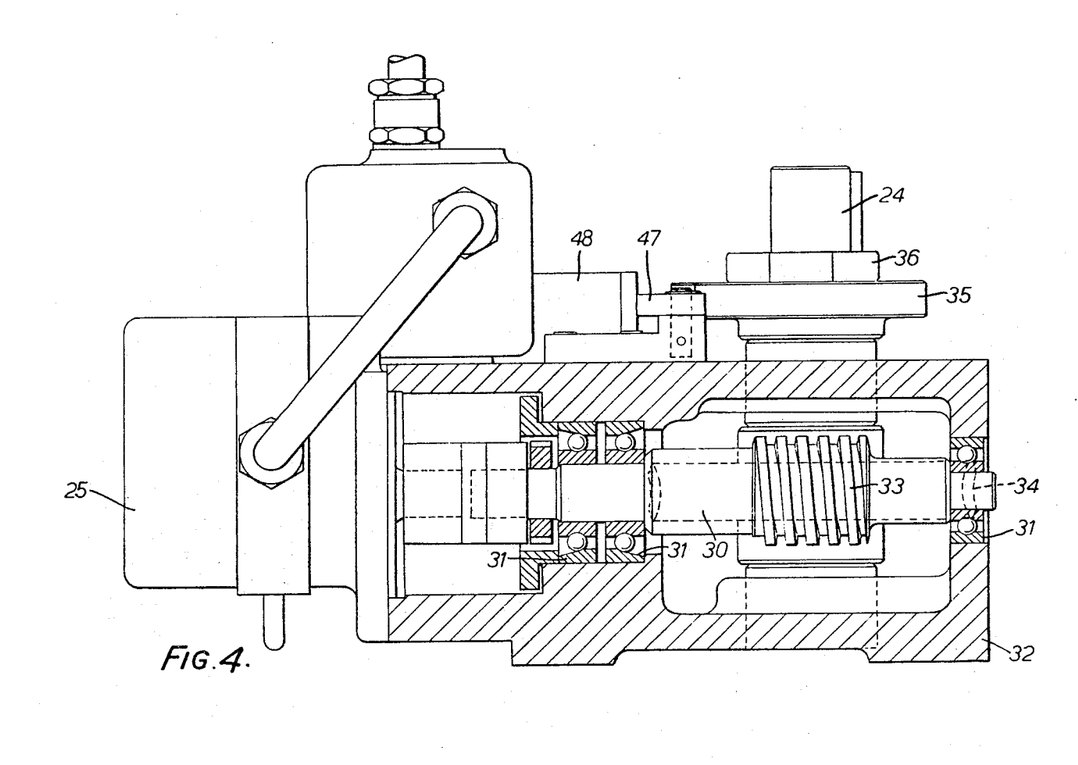
FIGURE 4 is an elevation and part longitudinal section of the mechanism shown in FIGURE 3.

The means for turning the indexing shaft 24 is shown in FIGURES 3 and 4 and also appears in FIGURE 1. The said indexing means comprises the fluid-operable motor 25, this being drivingly connected to a worm shaft 30 mounted in bearings 31 in a sub-housing 32 within the main housing 17. The worm shaft 30 has a worm 33 formed thereon and engaging a worm wheel 34 keyed to the indexing shaft 24, whereby rotation by the motor 25 of the worm shaft 30 will rotate the indexing shaft 24. The gear ratio of the pinion 23 and the gear annulus 22 is such that one complete revolution of the worm wheel 34 and the indexing shaft 24 will turn the chuck carrier 10 through one-sixth of a revolution, i.e., from one indexing position in which each chuck is axially aligned with a respective spindle to an adjacent indexed position in which each chuck is again axially aligned with a respective spindle. A cam 35 and a block 36, having a stop face 37, are also keyed for rotation with the indexing shaft 24. The stop face 37 is engageable with a stop face 38 on a plunger 39 mounted in a block 40 fixed to the sub-housing 32. The plunger 39 has an inner end 41 which forms a piston slidable in a cylindrical bore in the block 40. The plunger 39 is biased by a helical compression spring 42 within the bore in the block 40 into a position in which the plunger 39 is retracted, thereby removing the stop face 38 from the path of the stop face 37 of the block 36. As will hereinafter be described with reference to FIGURE 5, pressurised fluid is applied on operation of the motor 25 through an adjustable restrictor formed by a screw 43 co-operating with an admission port 44 in the block 40, whereby after a time delay, fluid pressure will act on the end face of the piston 41, remote from the spring 42, thereby overcoming the bias of the spring and causing the plunger to move into the path of the block 36, whereby the stop face 38 will engage the stop face 27, when the latter has reached the angular position of the former and hence the rotation of the indexing shaft 24 will be stopped after exactly one revolution. The cam 35 is rotatable in the direction of arrow X and has a profile comprising two part-circular lobes of different radii defined between a pair of radially-stepped portions 45, 46 (see FIGURE 3). The profile of the cam is engageable with a pivotally-mounted arm 47, arranged to operate the plunger 48 of a fluid control valve 49, shown in FIGURE 5, the plunger being depressed when the lobe of larger radius is engaging the arm 47 as illustrated in FIGURE 3. The fluid control valve 49 is connected between the motor 25 and a return pipe or sump 73 (see FIGURE 5). In parallel with the valve 49, there is a fixed restrictor 72 (also shown in FIGURE 5). The purpose of the valve 49 is two-fold. Firstly it acts as a brake to decelerate the motor and the parts rotatable thereby, by increasing the back pressure acting on the motor 25 to a value higher than the supply pressure thereto and thereby absorbing the stored kinetic energy of the rotating parts and causing the motor to operate as a pump. Secondly, when all the energy has been absorbed, the valve 49 will prevent any further flow of fluid through it and instead there will be only a small flow through the restrictor 72, thereby resulting in a low speed of rotation, so as to ensure that the indexing shaft will be brought to rest when it has completed one revolution.

Figure 5:
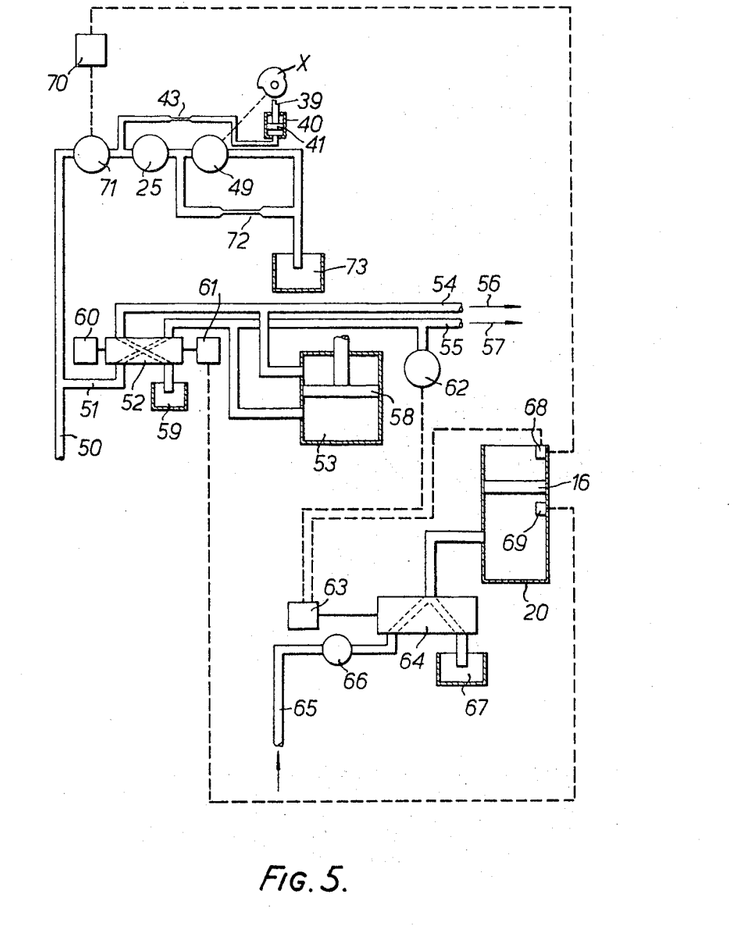
FIGURE 5 is a diagram showing the control circuit, inter alia for indexing the chuck carrier.

Referring now to FIGURE 5, which shows diagrammatically the fluid and electrical control circuits of the lathe, a pressurised fluid e.g., oil is admitted through a pipe 50 and a branch pipe 51, in series therewith, to a solenoid-operated piston-type change-over valve 52 by which the fluid is admitted to or exhausted from six clamping cylinders connected in parallel, one only being shown at 53, through pipes 54 and 55. The arrows 56 and 57 are used to indicate that the pipes 54 and 55 are connected to the five other clamping cylinders similar to cylinder 53. Each clamping cylinder is associated with one of the chucks 1 to 6, whereby the chuck can be clamped to the respective spindle after indexing has been effected and unclamped before commencing indexing of the chuck carrier 10. The piston 58 in each clamping cylinder 53 is pushed upward, as viewed in FIGURE 5, to unclamp the chuck from the spindle by pressure applied from the pipe 51 through the valve 52 to the pipe 55, oil being exhausted from the cylinders 53 through the pipe 54 and the valve 52 to a sump indicated at 59. The pistons 58 are moved in the reverse directions to clamp the chucks to the spindles by changing-over the valve 52 by moving the piston (not shown) therein, to the unclamping position, by a starting solenoid 60 and, to the clamping position, by a solenoid 61.

The pipe 55 communicates with a pressure responsive switch 62, which will complete an electric circuit to a solenoid 63, when the chucks have been unclamped from their respective cylinders. The solenoid 63 is arranged to operate a piston-type change-over valve 64 in a circuit which in one position of its piston (not shown) admits a pressurised fluid, e.g., oil, at a lower pressure than that in pipe 50, through a pipe 65, an accumulator 66 to the pipe unions 19 to act on the lifting ring 16 which engages the chuck carrier 10. The lifting ring 16 and the block 20, defining the chamber therefor, are indicated diagrammatically, using the same respective reference numerals 16 and 20 in FIGURE 5. In the other position of the piston (not shown) of the change-over valve 64, oil is released from the block 20 to sump 67, thereby allowing the lifting ring 16 and the chuck carrier to be lowered. Micro-switches 68 and 69 are so positioned as to be operated by the chuck carrier or a part movable therewith when the chuck carrier has been lifted and lowered respectively. The micro-switch 69 is connected to the solenoid 61, whereby the clamping cylinders 53 will be operated to re-clamp the chucks to their respective cylinders after indexing has been completed and the chuck carrier has been lowered. The trip switch 68 is connected to energise a solenoid 70 of a solenoid-actuated valve 71, which admits the higher pressure oil supply through the pipe 50 to the indexing motor 25, through the aforesaid valve 49 in series with the motor 25, to a sump 73. Before operation of the solenoid 70 to admit oil to the motor 25, the valve 71 is operated to permit oil acting on the piston 41 to be exhausted, thereby permitting the spring 42 to retract the plunger 39. Therefore immediately oil is admitted to the motor 25, the latter will accelerate the indexing shaft 24 and the cam 35 to the full speed of the motor 25, until the stepped portion 46 has passed the free end of the arm 47, the cam 35 turning in the direction of the arrow X in FIGURE 3. The plunger 48 of the valve 49 is then moved to the left as viewed in FIGURE 3, thereby closing the valve 49, thus braking the rotating parts as aforesaid and causing oil to flow from the motor 25 to the sump 73 and through the restrictor 72 at a reduced rate, the motor thereby rotating at a lower speed. As soon as oil is supplied to the motor 25, it will also be introduced at a slow rate through the port 44 under the control of the restrictor screw 43, the outer end of the plunger 39 will be moved away from the block 40, thereby to position the stop face 38 so that it will engage the stop face 37 when the cam 35 has returned to the position illustrated in FIGURE 3, and thereby to stall the motor 25 and to stop the rotation of the shaft 24 and the indexing of the chuck carrier. When an indexing movement has been completed, i.e., when the cam 35 and the indexing shaft 24 have made one complete revolution, the micro-switch 68 is re-engaged by the chuck carrier 10 and will energise the solenoid 63, to which the micro-switch 68 is also connected, thereby changing-over the valve 64 and effecting lowering of the chuck carrier 10. When that movement has been completed, the micro-switch 69 will be operated, thereby energising the solenoid 61 and effecting a change-over of the valve 52, thereby re-clamping the chucks to the spindles.

If necessary, the plunger can be held temporarily in its retracted position by an over-riding valve (not shown) preventing oil from acting on the piston 41, when oil is admitted to the motor 25, thereby permitting the indexing shaft to be rotated through more than one revolution, whereby the chuck carrier 10 can be indexed through more than one indexing position.

As the invention is primarily concerned with the provision of the chuck carrier 10 by which the chucks can be disengaged and re-engaged with the spindles 1 to 6 and with the means for indexing the chuck carrier, it is not considered necessary to describe the construction of the spindles 2 to 6 and their gear drives 8. The shaft 7 is driven by an electric motor in an upper part of the table and likewise it is not considered necessary to illustrate the electric motor, nor the tools which are also positioned above the chucks 9.

The chucks 9 may be of any convenient power-operated kind capable of being locked or unlocked when located on the non-driven loading spindle 1. A power-operated chuck and key mechanism suitable for this lathe is now described with reference to FIGURES 6 to 8 hereof.

Figure 6:
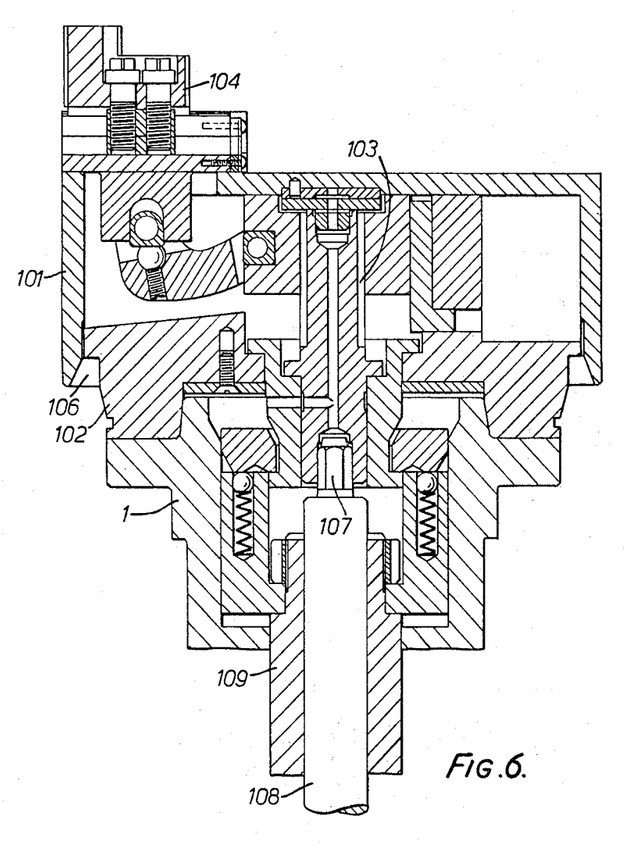
FIGURE 6 is an axial section through a chuck and showing the upper end of a key member for locking or unlocking the chuck.

Referring to FIGURE 6, each chuck 9 comprises an annular housing 101, 102 containing a rotatable operating member 103, which, according to the direction of its rotation, will effect radial inward or outward movement of jaws 104, one only being shown. As a chuck of this kind is well known no detailed description of its construction and operation is believed to be necessary. The chuck is shown resting on the non-driven spindle 1 of the lathe.

The lower end of the operating member 103 has a non-circular socket therein into which a correspondingly shaped end 107 of a key member 108 is insertable. The key member 108 is rotatable in a collar 109 mounted in a throughway in the spindle 1. The key member 108 can also be moved axially with respect to the spindle 1 so as to engage or disengage the end 107 and the socket in the operating member 103.

Figure 8:
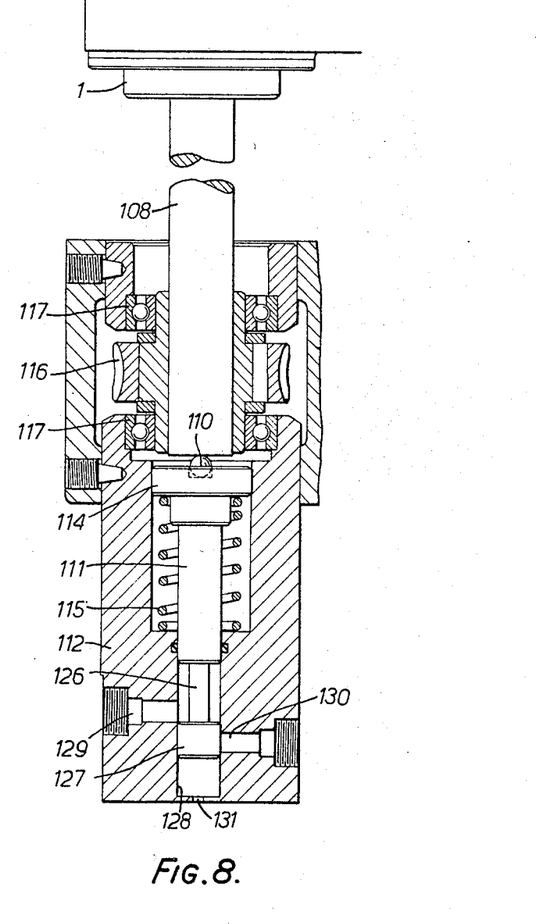
FIGURE 8 is an axial section through the lower end of the key member shown in FIGURE 6.

Referring now to FIGURE 8, the lower end of the key member 108 rests on a ball 110 carried in the head 114 of a piston 111 movable in a recess in a block 112. The piston is biased upwardly by a helical spring 115 engageable between the head 114 and a shoulder in the block 112 so as to cause the upper end 107 of the key member 108 to enter the socket in the operating member 103 of the chuck, when the end 107 has been angularly aligned with the socket. The lower end of the key member 108 carries a worm wheel 116 angularly fixed thereto and is mounted for rotation in bearings 117 mounted in the block 112.

Figure 7:
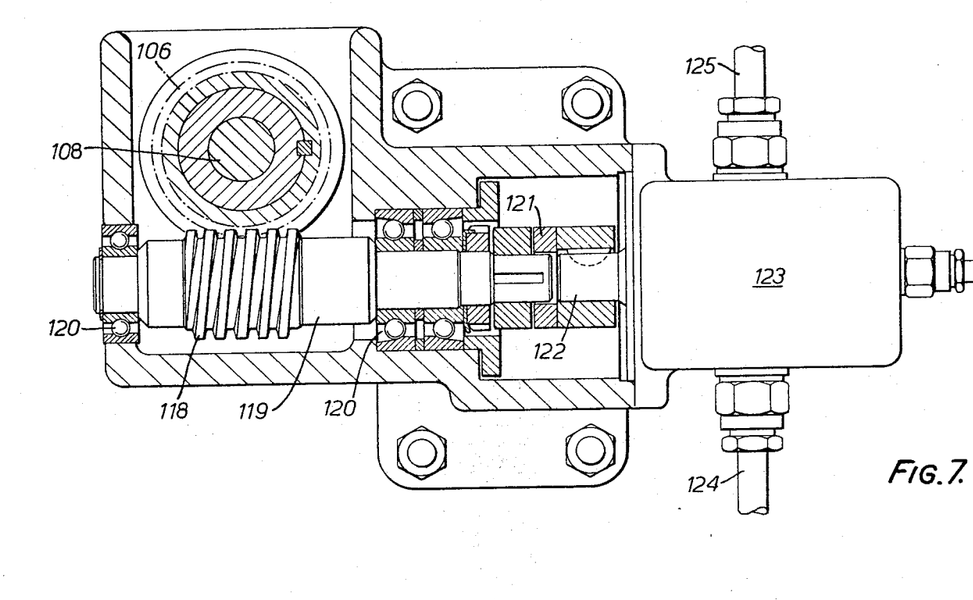
FIGURE 7 shows a transverse cross-section through the key member shown in FIGURE 6 and shows in part-section means for turning the key member.

Referring now to FIGURE 7, the worm wheel 116 is engaged by a worm 118 on a shaft 119 mounted in bearings 120 and engaged through a clutch 121 with the shaft 122 of a driving motor 123. The latter is operated by pressurized fluid circulated therethrough by pipes 124, 125. The direction of flow through the motor and hence its direction of rotation can be altered in accordance with the desired direction of rotation of the key member 108, depending on whether the jaws of the chuck are to be opened or closed.

The piston 111 and the block 112 together form a spill return valve, now described with reference to FIGURE 8. The piston 111 has an integral portion 126 of reduced diameter adjacent its lower end 127 which is engageable in a bore 128, being a continuation of the recess in the block 112. The bore 128 communicates with transverse passages 129, 130 forming sockets in which pipes can be inserted. The passage 129 is connected to a pipe branched from the supply pipe leading to the motor 123 and the passage 130 is connected by a spill return pipe to the inlet of a pump (not shown) supplying pressurised fluid to the motor. The passage 130 is opened and closed by the lower end 127 of the piston 111, which is shown in its upper position to which it is biased by the spring 115. As will be described hereinafter, the key member 108 can depress the piston 111 against the bias of the spring 115, thereby to open the passage 130, permitting a spill return flow through the passage 129, the bore 128 around the portion 126 of the piston and the passage 130. The block 112 has an end opening 131 communicating with the bore 128 beneath the end 127 to permit the downward movement of the piston 111.

The fluid circuit comprising the pump, the motor 123 and the spill return valve, just described, also includes a selector valve (not shown), operable to determine the direction of rotation of the motor 123 and hence whether the chuck is to be locked or unlocked; a pressure control valve (not shown) by means of which the motor can be controlled to vary locking or unlocking torque applied thereby to the key member 108 and hence to the jaws of the chuck, and a booster device (not shown), by means of which a surge of torque can be applied to the key member 108, when the chuck is to be unlocked.

The operation of the chuck-operating means will now be described. When a chuck 9 is engaged with the loading spindle 1, i.e., the spindle incorporating the key member 108 (as shown in FIGURE 6), the selector valve is operated according to the desired direction of rotation of the motor 123, thereby admitting pressurised fluid to the motor and into the bore 128 in the block 112, through the passage 129. As the piston 111 is then in its lower position, it having been pushed downwardly by the key member 108, the latter likewise having been pushed downwardly by the engagement of the chuck with the spindle, the port 130 is open, thereby permitting flow of fluid through the spill return pipe, this resulting in a reduction of fluid pressure in the inlet pipe to the motor, which will therefore deliver a low torque and will operate at a correspondingly low speed. During rotation of the key member 108 at the low speed, the non-circular upper end 107 thereof will assume a position of angular registration with the socket in the lower end of the operating member 103 of the chuck. When this has occurred, the spring 115 will push the piston 111 and the key member 108 upwardly so that the non-circular upper end of the key member 108 will be inserted into the socket in the operating member 103. When the said non-circular upper end has become fully engaged in the socket, i.e., when the piston has reached the position illustrated in FIGURE 8, the passage 130 will be closed, thereby stopping the flow of fluid to the spill return pipe. As a result, the fluid pressure in the inlet pipe to the motor will increase to a higher value, determined by the setting of said pressure control valve, and the motor will deliver a greater torque sufficient to unlock or lock the chuck. The gripping force of the jaws of the chuck on a workpiece therein can be controlled by said pressure control valve, which enables the higher torque delivered by the motor to be varied. A greater torque will be required to unlock the chuck to release the workpiece than to lock the chuck and this is provided by means of the aforesaid booster device.

The provision of the spill return valve enabling the motor to deliver a lower torque until full driving engagement of the non-circular end of the key member 108 in the socket in the operating member 103 has taken place, ensures that the flanks of the non-circular end or the faces of the socket will not become rounded, as this would affect the locking and unlocking of the chuck by the key member. When a chuck 9 has been locked or unlocked in this way, it can then be indexed to an operating spindle 2 to 6 of the lathe and another chuck 9 can be indexed into alignment with the loading spindle, where it will be unlocked to release the work and to be reloaded. A chuck can only be locked or unlocked when it is aligned with the loading spindle 1.

Although the lathe described herein has vertical spindles, the invention may be applied to a lathe having horizontal spindles, in which case, the chuck carrier will be mounted with its axis horizontal and be guided for sliding movement towards and away from the adjacent ends of the spindles. Also means would have to be provided for moving the carrier both towards and away from the spindles.

What I claim as my invention and desire to secure by Letters Patent of the United States is:

1. A multi-spindle automatic lathe including a plurality of rotatable spindles; a fixed bearing for each spindle, whereby the spindles are arranged with their axes of rotation parallel with each other and spaced apart circumferentially about a common axis parallel with the axes of the spindles; the same number of chucks as there are spindles, the chucks being arranged with their axes parallel with said common axis and spaced apart circumferentially therearound at the same radial distances therefrom and at the same circumferential spacing as the spindles; means for engaging each chuck with a corresponding spindle for driving rotation thereby, the said means being disengageable when the chucks are to be separated from the respective spindles; an annular chuck carrier coaxial with the said common axis and engageable with the chucks; means for moving the chuck carrier axially into and out of a position in which each chuck is so engaged with a corresponding spindle as to be rotated thereby, and means for moving the chuck carrier circumferentially, when the chucks have been separated from the respective spindles by the chuck carrier, thereby to effect a rotary indexing of the chuck carrier and the chucks with respect to the spindles.

2. A lathe as claimed in claim 1 in which said spindles are arranged vertically and said chucks are arranged to rest on the upper ends of the respective spindles to effect driving engagement therewith, said chuck carrier being movable axially between a lower position in which the carrier is clear of the chucks and a higher position to which it has lifted the chucks and in which it supports them clear of the respective spindles.

3. A lathe as claimed in claim 2 in which said means for moving said chuck carrier axially is operated by the application thereto of a pressurized fluid, said chuck carrier, when in its raised position, in which it has lifted the chucks out of engagement with the respective spindles, resting on a cushion of the fluid, thereby to facilitate the rotary indexing of the chuck carrier together with the chucks.

4. A lathe as claimed in claim 3 in which there is a housing enclosing said spindles and said indexing means and in which said chuck carrier has cylindrical flanges at its inner and outer peripheries, said housing having cylindrical walls co-operable with said flanges thereby to isolate said chuck carrier and said chucks from the interior of said housing.

5. A lathe as claimed in claim 4 in which said housing has thereon an annular trough for collecting swarf and coolant from the vicinity of the chucks, the inner wall of said trough being defined by one of said cylindrical walls and radially spaced from the co-operating flange of the chuck carrier, whereby compressed air introduced into the interior of said housing is allowed to escape between said radially-spaced flange and wall, the escape of compressed air outwardly of said housing preventing swarf and coolant from entering the interior of said housing.

6. A multi-spindle automatic lathe including a plurality of rotatable spindles; a fixed bearing for each spindle, whereby the spindles are arranged with their axes of rotation parallel with each other and spaced apart circumferentially about a common axis parallel with the axes of the spindles; the same number of chucks as there are spindles, the chucks being arranged with their axes parallel with said common axis and spaced apart circumferentially therearound at the same radial distances therefrom and at the same circumferential spacing as the spindles; means for engaging each chuck with a corresponding spindle for driving rotation thereby, the said means being disengageable when the chucks are to be separated from the respective spindles; an annular chuck carrier coaxial with the said common axis and engageable with the chucks; means for moving the chuck carrier axially into and out of a position in which each chuck is so engaged with a corresponding spindle as to be rotated thereby, and means for moving the chuck carrier circumferentially, when the chucks have been separated from the respective spindles by the chuck carrier, thereby to effect a rotary indexing of the chuck carrier and the chucks with respect to the spindles, said indexing means comprising an indexing shaft drivingly-engaged with said chuck carrier gear means effecting said driving engagement, the ratio of said gear means being such that one complete revolution of said indexing shaft will turn said chuck carrier from one indexing position to an adjacent indexing position, a fluid-operable motor drivingly-engaged to rotate said indexing shaft, a cam rotatable with said indexing shaft and arranged to control the fluid supply through said motor such that during an initial part of said one revolution of said indexing shaft, said motor will operate at a higher speed than during the remainder of said one revolution, thereby to prepare said indexing shaft for stopping at the end of exactly one revolution, and stop means operable to arrest said indexing shaft at precisely the end of said one revolution.

7. A lathe as claimed in claim 6 in which a stop member is mounted for rotation with said indexing shaft and in which said stop means comprises a plunger movable between an operative position in which it lies in the path of said stop member and an inoperative position in which it is retracted from the path of said stop member, spring means arranged to bias said plunger to its retracted position and means to apply fluid pressure to said plunger thereby to counteract the bias of said spring means, said means for applying fluid pressure including a restrictor, whereby when said fluid pressure is applied to the plunger, at the commencement of the said one revolution of said indexing shaft, said plunger will be moved into its operative position after a desired time delay during the said one revolution.

8. A multi-spindle automatic lathe including a plurality of rotatable spindles; a fixed bearing for each spindle, whereby the spindles are arranged with their axes of rotation parallel with each other and spaced apart circumferentially about a common axis parallel with the axes of the spindles; the same number of chucks as there are spindles, the chucks being arranged with their axes parallel with said common axis and spaced apart circumferentially therearound at the same radial distances therefrom and at the same circumferential spacing as the spindles; means for engaging each chuck with a corresponding spindle for driving rotation thereby, the said means being disengageable when the chucks are to be separated from the respective spindles; an annular chuck carrier coaxial with the said common axis and engageable with the chucks; means for moving the chuck carrier axially into and out of a position in which each chuck is so engaged with a corresponding spindle as to be rotated thereby, and means for moving the chuck carrier circumferentially, when the chucks have been separated from the respective spindles by the chuck carrier, thereby to effect a rotary indexing of the chuck carrier and the chucks with respect to the spindles, each chuck being of the power-operated kind having a plurality of jaws and a rotatable operating member, whereby the jaws or other work-gripping means in the chuck are opened and closed, the lathe also including a rotatable key member mounted in the vicinity of at least one of said spindles and arranged to engage the operating member of the chuck, when the latter is engaged with said one spindle, and power-operable means for turning the key member independently of said one spindle, when the chuck is engaged with the latter, thereby to effect opening or closing of the chuck.

9. A lathe, as claimed in claim 8 in which the key member is mounted co-axially of said one spindle and is slidable axially thereof, the lathe including means for biasing said key member into a position in which it is capable of drivingly-engaging the operating member of the chuck, when the latter is in driving engagement with the spindle, the key member and the operating member having adjacent end portions of non-circular cross-section and interengageable one within the other.

10. A lathe, as claimed in claim 9 in which the means for turning the key member comprises a motor of the kind operated by a pressurized fluid and a fluid circuit for supplying said pressurised fluid, said circuit including a circulating pump, the motor and a spill return valve of the piston type, said valve having a piston movable between open and closed positions, said piston being held in the open position by the key member against said biasing means until the non-circular end portions of the key member and the operating member are in angular registration one with the other to permit the key member to enter into driving engagement with the operating member when said piston is moved to the closed position, whereby when said piston is in the open position, the fluid pressure in said circuit is reduced thereby to effect operation of said motor to deliver a low torque, and, when said piston is in the closed position, the full fluid pressure is applied to said motor, thereby permitting the latter to deliver a higher torque.

No references cited.

WILLIAM W. DYER, Jr., *Primary Examiner.*

HARRISON L. HINSON, *Examiner.*